United States Patent
Do et al.

(10) Patent No.: US 9,482,851 B2
(45) Date of Patent: Nov. 1, 2016

(54) WIDE-ANGLE LENS

(71) Applicant: SIRTEC INTERNATIONAL (SUZHOU) CO. LTD, Suzhou, Jiangsu (CN)

(72) Inventors: Satoshi Do, Asaka (JP); C. S. Cheng, Chungli (CN)

(73) Assignee: SIRTEC INTERNATIONAL (SUZHOU) CO. LTD, Suzhou (CN)

(*) Notice: Subject to any disclaimer, the term of this patent is extended or adjusted under 35 U.S.C. 154(b) by 0 days.

(21) Appl. No.: 14/463,564

(22) Filed: Aug. 19, 2014

(65) Prior Publication Data

US 2015/0062722 A1    Mar. 5, 2015

(30) Foreign Application Priority Data

Aug. 29, 2013  (JP) .................................. 2013-177845

(51) Int. Cl.
*G02B 3/02*  (2006.01)
*G02B 13/18*  (2006.01)
(Continued)

(52) U.S. Cl.
CPC ................. *G02B 13/18* (2013.01); *G02B 9/34* (2013.01); *G02B 13/04* (2013.01); *G02B 13/06* (2013.01); *G02B 5/005* (2013.01); *G02B 9/60* (2013.01); *G02B 13/0045* (2013.01); *G02B 27/0025* (2013.01)

(58) Field of Classification Search
CPC .... G02B 13/0045; G02B 9/60; G02B 13/18; G02B 13/04; G02B 27/0025; G02B 5/005
USPC .................................. 359/714, 740, 753, 770
See application file for complete search history.

(56) References Cited

U.S. PATENT DOCUMENTS

2002/0171942 A1    11/2002   Narimatsu
2003/0137750 A1*    7/2003   Tsutsumi ............... G02B 13/04
                                                        359/749
(Continued)

FOREIGN PATENT DOCUMENTS

CN    101408666    4/2009
CN    101796449    8/2010
(Continued)

OTHER PUBLICATIONS

EPO; European Search Report dated Jul. 1, 2015 in Application No. 14161562.5.

*Primary Examiner* — Evelyn A Lester
(74) *Attorney, Agent, or Firm* — Snell & Wilmer L.L.P.

(57) ABSTRACT

A wide-angle lens is disclosed. The wide-angle lens includes a first lens element $L_1$, a second lens element $L_2$, a third lens element $L_3$, an aperture diaphragm S, a fourth lens element $L_4$ and a fifth lens element $L_5$ arranged from an object plane to an image plane. The first element $L_1$ is a meniscus lens element having a negative focal power and protruding toward the object plane, the second element $L_2$ is a meniscus lens element having a negative focal power and protruding toward the object plane, the third element $L_3$ is a meniscus lens element having a positive focal power and protruding toward the image plane, the fourth element $L_4$ is a meniscus lens element having a negative focal power and protruding toward the object plane, and the fifth element $L_5$ is a lens element having a positive focal power.

8 Claims, 9 Drawing Sheets

(51) Int. Cl.

|  |  |
|---|---|
| *G02B 9/60* | (2006.01) |
| *G02B 9/34* | (2006.01) |
| *G02B 13/06* | (2006.01) |
| *G02B 13/04* | (2006.01) |
| *G02B 5/00* | (2006.01) |
| *G02B 13/00* | (2006.01) |
| *G02B 27/00* | (2006.01) |

(56) References Cited

U.S. PATENT DOCUMENTS

| 2011/0051259 A1 | 3/2011 | Yin et al. |
| 2012/0069140 A1 | 3/2012 | Tsai et al. |
| 2013/0208365 A1 | 8/2013 | Hsu et al. |

FOREIGN PATENT DOCUMENTS

| CN | 102027403 | 4/2011 |
| CN | 102289052 | 12/2011 |
| CN | 102289053 | 12/2011 |
| CN | 102466858 | 5/2012 |
| CN | 202230237 | 5/2012 |
| EP | 2187250 | 5/2010 |
| JP | 2006-284620 | 10/2006 |
| JP | 2009-63877 | 3/2009 |
| JP | 2011-107593 | 6/2011 |
| JP | 2013-205715 | 10/2013 |
| TW | 201314252 | 4/2013 |

\* cited by examiner

WIDE-ANGLE LENS

CROSS-REFERENCE TO RELATED APPLICATIONS

The present application claims priority from Japanese Application No. 2013-177845 filed on Aug. 29, 2013.

FIELD OF THE INVENTION

The present disclosure relates to the field of optical lens, and more particularly, to a wide-angle lens for car camera (e.g. car camera for rear vehicle monitor or vehicle travelling data recorder), security camera, door-phone camera, meeting camera and the like.

BACKGROUND OF THE INVENTION

There are several kinds of traditional camera lens, including normal lens, telephoto lens, wide-angle lens and so on. Among the several camera lenses, the wide-angle lens is a lens by which the range of a camera can be shot in a wider viewing angle, and according to the wide-view characteristic of the wide-angle lens, it is generally widely applied in a camera device for a monitor or car. At present, the miniaturization of camera devices becomes a trend of social development, and demands are increasing for small wide-angle lens with a viewing angle exceeding 180°.

A wide-angle lens mounted in a camera device has a relatively short optical length. The optical length is a distance from an incident plane to an imaging plane (i.e., an illuminated face of an image sensor) of an object plane of the wide-angle lens. In addition, in order to achieve the micro-miniaturization of the wide-angle lens, the ratio of the focal distance of the wide-angle lens to the above optical length should be also reduced.

Since an existing wide-angle lens is made up of a plurality of lens elements, therefore at present, the number of the lens elements inside the wide-angle lens is required to as few as possible to form a small wide-angle lens. However, the fewer lens elements in the wide-angle lens, the lower ability the optical aberration compensation has, and ultimately leads to worse image quality formed in the imaging plane.

In addition, the wide-angle lens is generally used in different circumstances. If the wide-angle lens is mounted outside the car, the surface of a first lens element located on the object plane can be exposed to a variety of severe conditions such as UV (ultraviolet ray), acid rain, dust, rubble and so on. Normal resin lens is harder to bear such circumstances.

SUMMARY OF THE INVENTION

In view of the above, it is necessary to provide a small wide-angle lens, which can improve the camera lens field of view when obtaining a good image quality on the imaging plane, and shorten the optical length when sufficiently protecting the back focal distance of the wide-angle lens.

A wide-angle lens includes a first lens element $L_1$, a second lens element $L_2$, a third lens element $L_3$, an aperture diaphragm S, a fourth lens element $L_4$ and a fifth lens element $L_5$ arranged from an object plane to an image plane. The first lens element $L_1$ is a meniscus lens element having a negative focal power and protruding toward the object plane, the second lens element $L_2$ is a meniscus lens element having a negative focal power and protruding toward the object plane, the third lens element $L_3$ is a meniscus lens element having a positive focal power and protruding toward the image plane, the fourth lens element $L_4$ is a meniscus lens element having a negative focal power and protruding toward the object plane, and the fifth lens element $L_5$ is a lens having a positive focal power. Both sides of the first lens element $L_1$ are spherical surfaces, and both sides of the second lens element $L_2$, the third lens element $L_3$, the fourth lens element $L_4$ and the fifth lens element $L_5$ are aspheric surfaces.

Meanwhile, the wide-angle lens meets the following requirements:

$$0.91 < h_2/r_2 < 0.95,$$

$$1.49 < n_1 < 1.59,$$

$$0.08 \leq f/D \leq 0.1,$$

$$54 \leq v_1 \leq 65, \text{ and}$$

$$193° < \theta < 220°,$$

wherein, $h_2$ is an image-side effective radius of the first lens element $L_1$, $r_2$ is an image-side curvature radius of the first lens element $L_1$, $n_1$ is a D-line refractive index of the first lens element $L_1$, f is a focal distance of the wide-angle lens, D is an aperture of the wide-angle lens, $v_1$ is an Abbe number of the first lens element $L_1$, and $\theta$ is a viewing angle of the wide-angle lens.

Preferably, the first lens element $L_1$ can be an optical glass lens element, the second lens element $L_2$ can be an optical resin lens element, the third lens element $L_3$ can be an optical resin lens element, the fourth lens element $L_4$ can be an optical resin lens element and the fifth lens element $L_5$ can be an optical resin lens element.

Preferably, the first lens element $L_1$ can be an optical resin lens element, the second lens element $L_2$ can be an optical resin lens element, the third lens element $L_3$ can be an optical resin lens element, the fourth lens element $L_4$ can be an optical resin lens element and the fifth lens element $L_5$ can be an optical resin lens element.

Preferably, the first lens element $L_1$ can be a crown glass lens element, the second lens element $L_2$ can be a cycloolefin resin lens element, the third lens element $L_3$ can be a polycarbonate resin lens element, the fourth lens element $L_4$ can be a polycarbonate resin lens element and the fifth lens element $L_5$ can be a cycloolefin resin lens element.

Preferably, the first lens element $L_1$ can be a cycloolefin resin lens element, the second lens element $L_2$ can be a cycloolefin resin lens element, the third lens element $L_3$ can be a polycarbonate resin lens element, the fourth lens element $L_4$ can be a polycarbonate resin lens element and the fifth lens element $L_5$ can be a cycloolefin resin lens element.

Preferably, the first lens element $L_1$ can be an acrylic lens, the second lens element $L_2$ can be a cycloolefin resin lens element, the third lens element $L_3$ can be a polycarbonate resin lens element, the fourth lens element $L_4$ can be a polycarbonate resin lens element and the fifth lens element $L_5$ can be a cycloolefin resin lens element.

The present disclosure relates to an optical simulation result taking a wide-angle lens having a viewing angle of more than about 190° as an object, and the requirement of a wide-angle lens having a viewing angle $\theta$ of more than 190° is difficult to achieve if the lower limit of the conditional expression $0.91 < h_2/r_2 < 0.95$ cannot be met (i.e., $h_2/r_2$ is less than 0.91). If the viewing angle $\theta$ is above the upper limit value 220° given by the conditional expression 193°<θ<220°, the peripheral illumination of the imaging plane is smaller than the center illumination of the imaging plane, which causes the periphery of the image be too gloomy. And if the upper limit of the conditional expression 0.91<$h_2/r_2$<0.95 cannot be met (i.e. $h_2/r_2$ is more than 0.95), and if the first lens element $L_1$ is made of glass, the shape of the surface of the first lens element $L_1$ will be made to be close to a hemisphere due to the relationship between the curvature radius and the effective radius of the image plane of the first lens element $L_1$, which causes polishing in practical production unsuitable.

Whether the first lens element $L_1$ is made of glass or resin, the lenses form $L_2$ to $L_5$ can use the same lenses series by specifying D-line refractive index $n_1$ of the first lens element $L_1$ within the range of 1.49~1.59. If $n_1$ is below the lower limit of the conditional expression 1.49<n1<1.59 (i.e., $n_1$ is less than 1.49), the viewing angle θ is not able to get the range of wide-angle. And if $n_1$ is beyond the upper limit (i.e., $n_1$ is more than 1.59), various types of aberrations caused by the first lens element $L_1$ cannot be corrected to obtain an extent of good image quality.

When the conditional expression 0.08≤f/D≤0.1 is met, the object to provide a small wide-angle lens with a short optical length and a back focal distance as long as possible can be achieved. If f/D is below the lower limit of the conditional expression 0.08≤f/D≤0.1 (i.e., f/D is less than 0.08), in order to ensure the back focal distance (i.e., the distance from the image-side of the fifth lens element $L_5$ to the imaging plane), it needs to lengthen the optical length that the wide-angle lens cannot reach the requirements of miniaturization. If f/D is beyond the upper limit (i.e., f/D is more than 0.1), the viewing angle θ is not able to get the range of wide-angle, and the focal distance is also not able to reach the demand.

If the value of f/D is less than the upper limit of 0.1, an optical component such as cover glass or optical filter can be provided between the image-side of the fifth lens element $L_5$ and the imaging plane (i.e., an illuminated face of an image sensor). If the value of f/D is more than 0.08, the chromatic aberration can be controlled in a small range to achieve good image quality.

The above wide-angle lens also can prevent light shading phenomenon when the incident ray is approximately vertically incident upon the illuminated face of the image sensor from the center to the periphery of the image.

If the Abbe number of the first lens element $L_1$ is set to meet the conditional expression 54≤$v_1$≤65, the chromatic aberration, especially axial chromatic aberration, can be full corrected to achieve good image quality. In addition, the lens material with an Abbe number within 54 to 65 is also common on the market and can be bought.

In the traditional lens design, if the first lens element is made of glass or the first lens element is made of resin, the curvature radius, interplanar distance, effective radius and aspherical coefficient of other lenses which match with the first lens element cannot be made in the same design, so if the first lens element is made of glass or resin, the other lenses which match with it need to be designed.

The first lens element $L_1$ of the above wide-angle lens can be glass or resin according to practical use, and the other lenses which match with it can be employed universally. Namely, it only needs to replace the first lens element $L_1$, the performance parameters of the second to fifth lens elements can be achieve share. In the actual production, the molds of the second to fifth lens elements can be shared, and the most production processes can be unified, so as to effectively reduce production cost.

In conclusion, the above wide-angle lens is composed of five lenses and has the following beneficial effects.

a. The viewing angle θ of the wide-angle lens is more than 190° that the requirement of wide filed of the wide-angle lens can be ensured.

b. If the conditional expression 0.08≤f/D≤0.1 is met, the object to provide a small wide-angle lens with a short optical length and a back focal distance as long as possible can be achieved, in addition, the third lens element $L_3$ is a lens having a positive focal power and protruding toward the image plane, so that the effective aperture and the optical length of the first lens element $L_1$ can be reduced, and the requirement for miniaturizing the wide-angle lens can be achieved.

c. Specifying the effective radius and curvature radius of the image-side of the first lens element $L_1$ to meet the conditional expression 0.91<h2/r2<0.95, if the first lens element $L_1$ is a glass lens, the lens can be polished, and the requirement of low cost for the first lens element $L_1$ can be achieved.

d. By specifying the refractive index and Abbe number of the first lens element $L_1$, whether the first lens element $L_1$ is made of glass or resin, when it matches with the second to fifth lens elements, the wide-angle lens can has a good aberration compensation, so as to meet the requirement to obtain a good image quality.

e. Whether the first lens element L1 is made of glass or resin, the second to fifth lens elements can use the same lenses series, so as to reduce the production cost.

Table 1 shows optical design data of Embodiment One.
Table 2 shows optical design data of Embodiment Two.
Table 3 shows optical design data of Embodiment Three.
Table 4 shows optical design data of Embodiment Four.

The reference signs of specific components are listed as follows:

10: image sensor, CG: cover glass, S: aperture diaphragm, $L_1$: first lens element $L_1$, $L_2$: second lens element $L_2$, $L_3$: third lens element $L_3$, $L_4$: fourth lens element $L_4$, $L_5$: fifth lens element $L_5$, $r_1$: curvature radius of the optical axis in Side i, $d_i$: interplanar distance from Side i to Side (i+1), and $h_i$: effective radius of Side i.

DETAILED DESCRIPTION OF THE INVENTION

Figure 1:
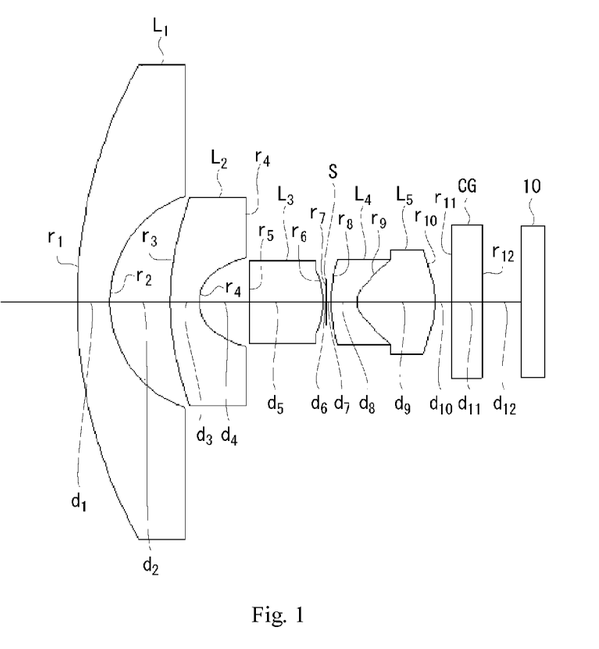
FIG. 1 is a schematic diagram illustrating a wide-angle lens according to one embodiment of the present disclosure (the object plane is in the leftmost position, and the image plane is in the rightmost position).

FIG. 1 is a schematic diagram illustrating a wide-angle lens according to one embodiment of the present disclosure. The signs of each side of the lens and the distance between each side of the lens defined in FIG. 1 are applied in FIG. 2, FIG. 6, FIG. 10 and FIG. 14 as well.

Parameters used in the wide-angle lens are defined as follows.

In $r_i$ (i=1, 2, 3, ..., 13) and $d_i$ (i=1, 2, 3, ..., 13) as shown in FIG. 1 and data given in Tables 1 to 4, i represents a sequential number of each side of the lens elements from object plane to image plane in turn.

Namely, $r_i$ shows a curvature radius of the optical axis in Side i, $d_i$ shows an interplanar distance from Side i to Side (i+1), $n_i$ shows a refractive index of a lens from Side i to Side (i+1), $v_i$ shows an Abbe number of a lens from Side i to Side (i+1), and $h_i$ shows an effective radius of Side i.

In the diagram, the aperture diaphragm is expressed in line. This is to determine a distance from the lens side to the diaphragm side, and the intersection of the diaphragm side and the optical axis has to be made clear.

The thickness of the aperture diaphragm S can be ignored.

The back focal distance $b_f$ shows a distance from the image plane to the image-side of the fifth lens element $L_5$. A cover glass CG can be generally provided between the fifth lens element $L_5$ and the image-side. Because the refractive index of the cover glass CG is more than 1, the back focal distance $b_f$ measured when provided with a cover glass CG is shorter than the back focal distance $b_f$ measured when not provided with a cover glass CG, so the back focal distance $b_f$ is defined as a distance between the fifth lens element $L_5$ and the image-side measured when not provided with a cover glass CG.

A cover glass CG with a refractive index of 1.51680 and a thickness of 0.8118 mm is provided. The value calculated when the cover glass CG is removed is used for the distance D from the incident plane of the object plane to the image-side and the back focal distance $b_f$. Namely, the distance D from the incident plane of the object plane to the image-side and the back focal distance $b_f$ are calculated equivalently when the thickness of the cover glass CG is 0.5352 (=0.8118/1.51680).

The optical length D is calculated by adding the back focal distance $b_f$ to the distance of the optical axis from the first side of the object plane of the first lens element $L_1$ to last side of the image-side of the fifth lens element $L_5$, i.e., the optical length D is calculated by adding the back focal distance $b_f$ to the combined total of $d_1$ to $d_9$.

Please refer to Table 1 to Table 4, the surface $r_7$ of the diaphragm S and two surfaces $r_{11}$ and $r_{12}$ of the cover glass are flat surfaces, their curvature radiuses are expressed by ∞. The curvature radiuses of other surfaces are $r_i$ (i=1, 2, 3, ..., 13), where the curvature radius in a surface that protrudes toward the object plane is positive, and the curvature radius in a surface that protrudes toward the image plane is negative.

The aspheric surface used in the present disclosure is defined as follows.

$$Z=ch^2/[1+\{1-(1+k)c^2h^2\}^{+1/2}]+A_4h^4+A_6h^6+A_8h^8,$$

where, Z is the vector height of the aspheric surface, C is the paraxial curvature of the aspheric surface, h is the aperture of the lens, k is the cone coefficient, $A_4$ is the fourth power of the aspheric surface, $A_6$ is the sixth power of the aspheric surface, and $A_8$ is the eighth power of the aspheric surface.

The coefficient value of the aspheric surface is expressed by index value in Tables 1-4, for example, "$e^{-1}$" shows "−1 power of 10". The unit of the focal distance f of the wide-angle lens is mm.

FIG. 3, FIG. 7, FIG. 11 and FIG. 15 show chromatic aberration and spherical aberration curves. The curve is direct to aberrations shown in C-line (light of 640 nm wave length), d-line (light of 587.6 nm wave length), e-line (light of 546.1 nm wave length), F-line (light of 486.1 nm wave length) and g-line (light of 435.8 nm wave length). The refractive index uses the refractive index of D-line (587.6 nm light).

In the diagrams, the horizontal axis is chromatic aberration or spherical aberration value (its unit is nm), and the vertical axis is incident height h, where the incident height h of the vertical axis is calculated as the percentage of F value, i.e., for each embodiment of the lens, when the incident height h of the vertical axis is equal to 100%, the corresponding F is equal to 2.45.

FIG. 4, FIG. 8, FIG. 12 and FIG. 16 show astigmatism curves. In the diagrams, the horizontal axis is the aberration on the meridian plane and the sagittal plane (its unit is mm), the vertical axis is the percentage of image height, where 0% expresses an optical axis position, and 100% expresses a position of the maximal image height.

FIG. 5, FIG. 9, FIG. 13 and FIG. 17 show optical distortion curves which show variation of distortion caused by the imaging plane centering on the optical axis and extending outward. In the diagrams, the horizontal axis is the ratio of distortion (its unit is %), and the vertical axis is the percentage of image height.

The material parameters of the lens used are defined as follows.

For crown glass BSC7, the D-line refractive index is 1.5168, and the Abbe number is 64.20.

For crown glass BACD5, the D-line refractive index is 1.58913, and the Abbe number is 61.25.

For cycloolefin resin E48R, the D-line refractive index is 1.5300, and the Abbe number is 56.00.

For polycarbonate resin AD5503, the D-line refractive index is 1.58500, and the Abbe number is 30.00.

For acrylic resin PMMA, the D-line refractive index is 1.49200, and the Abbe number is 57.80.

For cover glass, it uses an optical glass BK7 where the D-line refractive index is 1.51680 and the Abbe number is 64.2.

Embodiment One

Figure 2:
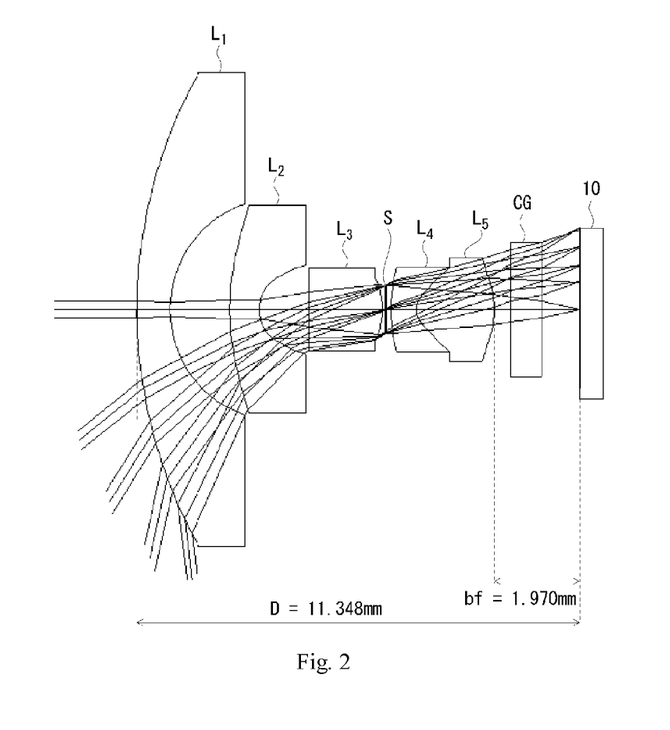
FIG. 2 is a schematic diagram illustrating a wide-angle lens according to Embodiment One of the present disclosure.

Please refer to FIG. 2, illustrating a wide-angle lens according to Embodiment One. The wide-angle lens includes a first lens element $L_1$, a second lens element $L_2$, a third lens element $L_3$, aperture diaphragm S, a fourth lens element $L_4$ and a fifth lens element $L_5$ arranged from an object plane to an image plane.

The first lens element $L_1$ is a meniscus lens element having a negative focal power and protruding toward the object plane, the second lens element $L_2$ is a meniscus lens element having a negative focal power and protruding toward the object plane, the third lens element $L_3$ is a meniscus lens element having a positive focal power and protruding toward the image plane, the fourth lens element $L_4$ is a meniscus lens element having a negative focal power and protruding toward the object plane, and the fifth lens element $L_5$ is a lens having a positive focal power. Wherein, both sides of the second lens element $L_2$, the third lens element $L_3$, the fourth lens element $L_4$ and the fifth lens element $L_5$ are aspheric surfaces.

In Embodiment One, the first lens element $L_1$ is made of crown glass BSC7 (produced by OHARA INC), the second lens element $L_2$ is made of cycloolefin resin E48R (produced by Japan ZEON Corporation), the third lens element $L_3$ and the fourth lens element $L_4$ are made of polycarbonate AD5503 (produced by TEIJIN Corporation), and the fifth lens element $L_5$ is made of cycloolefin resin E48R.

Please refer to the structured data of Embodiment One in Table 1.

$$f/D = 0.088,$$

$$v_1 = 64.2, \text{ and}$$

$$\theta = 193.8°.$$

We learn that the wide-angle lens according to Embodiment One meets any of the following conditional expressions (1)-(5).

$$h_2/r_2 < 0.95 \tag{1}$$

$$1.49 < n_1 < 1.59 \tag{2}$$

$$0.08 \leq f/D \leq 0.1 \tag{3}$$

$$54 \leq v_1 \leq 65 \tag{4, and}$$

$$193° < \theta < 220° \tag{5}$$

Figure 3:
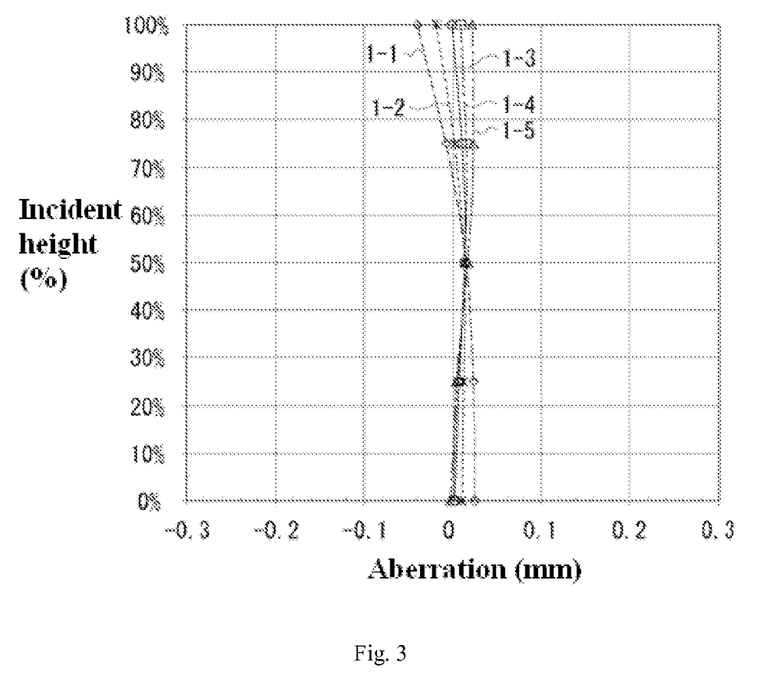
FIG. 3 is a chromatic aberration and spherical aberration curve of a wide-angle lens according to Embodiment One of the present disclosure.

In FIG. 3, 1-1 shows an aberration curve of g-line, 1-2 shows an aberration curve of F-line, 1-3 shows an aberration curve of e-line, 1-4 shows an aberration curve of d-line, and 1-5 shows an aberration curve of C-line.

In FIG. 4, 1-6 shows an aberration curve on the meridian plane, and 1-7 shows an aberration curve on the sagittal plane.

In FIG. 5, 1-8 shows an optical distortion curve.

The vertical axis of the aberration curve in FIG. 3 shows incident height h (FNO.), and the maximum corresponds to F2.45. The ratio of the distance of the aberration curve from the optical axis to the maximal image height is also shown. The magnitude of the aberration is shown in the horizontal axis in the unit of mm.

TABLE 1

| Curvature Radius ($r_i$) | Distance ($d_i$) | Refractive Index ($N_i$) | Abbe number ($V_i$) | Effective Radius (hi) | Aspherical Coefficient | | | |
|---|---|---|---|---|---|---|---|---|
| | | | | | K | $A_4$ | $A_6$ | $A_8$ |
| $r_1 = 12.703$ | $d_1 = 0.8596$ | 1.5168 | 64.2 | 6.21 | | | | |
| $r_2 = 2.9417$ | $d_2 = 1.5778$ | | | 2.78 | | | | |
| $r_3 = 7.7106$ | $d_3 = 0.7622$ | 1.53 | 56 | 2.73 | 4.149000e−001 | 5.007547e−003 | −1.086037e−003 | 5.720909e−005 |
| $r_4 = 0.8357$ | $d_4 = 1.3066$ | | | 1.17 | −5.622000e−001 | −4.523205e−002 | 3.643608e−002 | 1.233140e−002 |
| $r_5 = 9.1939$ | $d_5 = 1.9341$ | 1.585 | 30 | 1.1 | 0 | −4.435977e−002 | 3.938015e−002 | −3.518331e−002 |
| $r_6 = -2.0401$ | $d_6 = 0.0774$ | | | 0.81 | 0 | −4.781444e−002 | 2.625763e−002 | 0 |
| $r_7 = \infty$ | $d_7 = 0.1433$ | | | 0.63 | | | | |
| $r_8 = 2.7249$ | $d_8 = 0.6667$ | 1.585 | 30 | 1.11 | −1.582000e+001 | −2.578950e−002 | 1.784059e−002 | 0 |
| $r_9 = 0.4327$ | $d_9 = 2.0506$ | 1.53 | 56 | 1.11 | −1.352 | −2.090017e−001 | 2.123760e−001 | −9.276478e−002 |
| $r_{10} = -2.2159$ | $d_{10} = 0.4348$ | | | 1.36 | −9.377 | −4.898513e−002 | 2.335130e−002 | −5.777456e−004 |
| $r_{11} = \infty$ | $d_{11} = 0.8118$ | 1.5168 | 64.2 | | | | | |
| $r_{12} = \infty$ | $d_{12} = 1.0000$ | | | | | | | |

Table 1 can calculate the following data.

As shown in FIG. 2, in the wide-angle lens according to Embodiment One, if the back focal distance of focal distance 1.00 mm can be 2.2466 mm after a cover glass being inserted, a long enough back focal distance can be ensured.

The value of F is 2.45, which ensures enough brightness for a wide-angle lens.

$h_2$ is 2.78 mm, $r_2$ is 2.9417 mm, $n_1$ is 1.5168, $v_1$ is 64.2, f is 1.00 mm, and calculations showed that the optical length D is 11.348 mm.

The above data is plug into the following formula.

$$h_2/r_2 = 2.78/2.9147 = 0.945,$$

$$n_1 = 1.5168,$$

Figure 4:
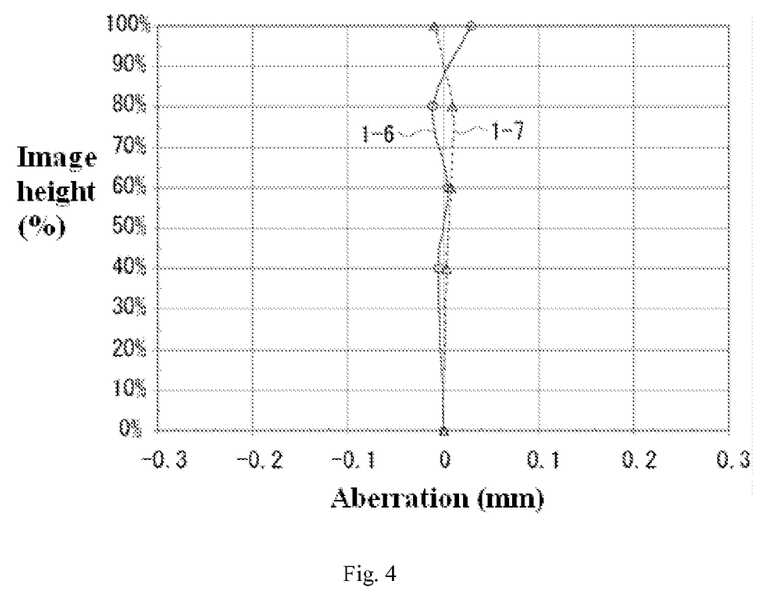
FIG. 4 is an astigmatism curve of a wide-angle lens according to Embodiment One of the present disclosure.
Figure 5:
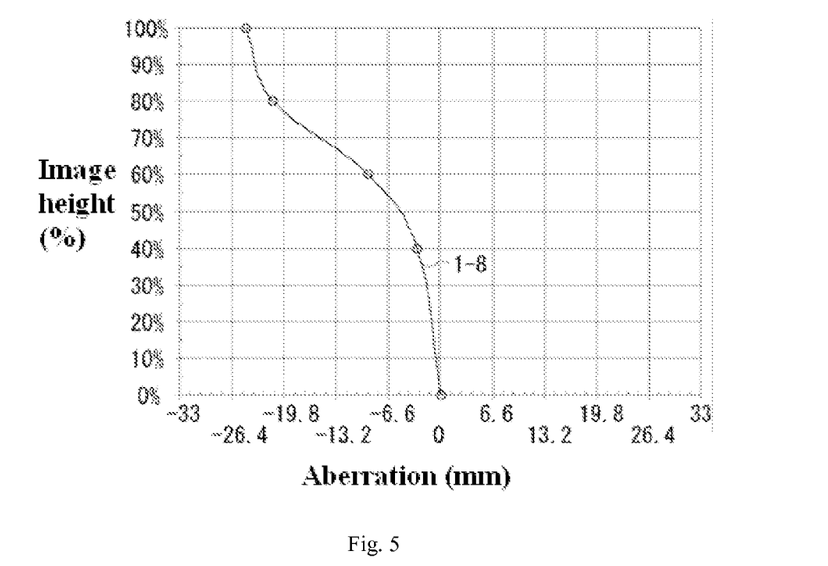
FIG. 5 is a distortion curve of a wide-angle lens according to Embodiment One of the present disclosure.

The image heights of 100%, 80%, 60%, 40% and 0% in FIGS. 4-5 correspond to the heights of 2.144 mm, 1.643 mm, 1.164 mm, 0.731 mm and 0 mm on the practical image-side respectively.

The value of F showing the brightness of the lens is 2.5. In addition, the value of F of the wide-angle lens in the following Embodiments Two-Four is also 2.5.

As shown in FIGS. 3-5, the above chromatic aberration, spherical aberration, astigmatism and optical distortion have been corrected well.

Embodiment Two

Figure 6:
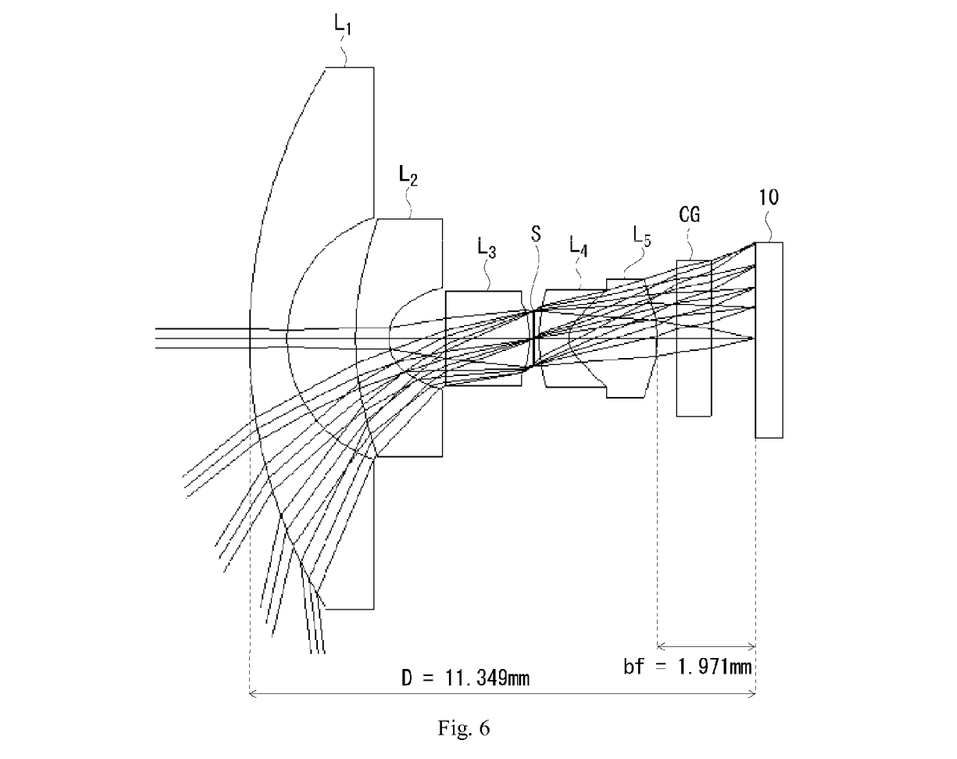
FIG. 6 is a schematic diagram illustrating a wide-angle lens according to Embodiment Two of the present disclosure.

Please refer to FIG. 6, illustrating a wide-angle lens according to Embodiment Two. The structure of the wide-angle lens is the same as that of the wide-angle lens according to Embodiment One. The difference is that the first lens element $L_1$ and the second lens element $L_2$ are made of cycloolefin resin E48R, the third lens element $L_3$ and the fourth $L_4$ are made of polycarbonate AD5503, and the fifth lens element $L_5$ is made of cycloolefin resin E48R in Embodiment Two.

Please refer to the structured data of Embodiment Two in Table 2.

Figure 7:
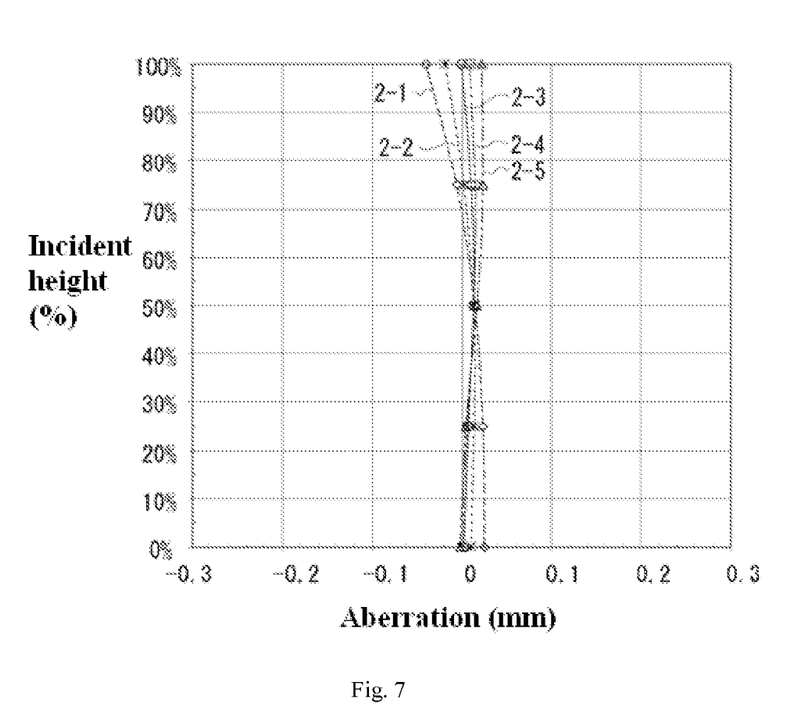
FIG. 7 is a chromatic aberration and spherical aberration curve of a wide-angle lens according to Embodiment Two of the present disclosure.

In FIG. 7, 2-1 shows an aberration curve of g-line, 2-2 shows an aberration curve of F-line, 2-3 shows an aberration curve of e-line, 2-4 shows an aberration curve of d-line, and 2-5 shows an aberration curve of C-line.

In FIG. 8, 2-6 shows an aberration curve on the meridian plane, and 2-7 shows an aberration curve on the sagittal plane.

In FIG. 9, 2-8 shows an optical distortion curve.

TABLE 2

| Curvature Radius ($r_i$) | Distance ($d_i$) | Refractive Index ($N_i$) | Abbe number ($V_i$) | Effective Radius (hi) | Aspherical Coefficient | | | |
|---|---|---|---|---|---|---|---|---|
| | | | | | K | $A_4$ | $A_6$ | $A_8$ |
| $r_1 = 11.8$ | $d_1 = 0.8596$ | 1.53 | 56 | 6.21 | | | | |
| $r_2 = 2.9282$ | $d_2 = 1.5778$ | | | 2.78 | | | | |
| $r_3 = 7.7106$ | $d_3 = 0.7622$ | 1.53 | 56 | 2.73 | 4.149000e−001 | 5.007547e−003 | −1.086037e−003 | 5.720909e−005 |
| $r_4 = 0.8357$ | $d_4 = 1.3066$ | | | 1.17 | −5.622000e−001 | −4.523205e−002 | 3.643608e−002 | 1.233140e−002 |
| $r_5 = 9.1939$ | $d_5 = 1.9341$ | 1.585 | 30 | 1.1 | 0 | −4.435977e−002 | 3.938015e−002 | −3.518331e−002 |
| $r_6 = -2.0401$ | $d_6 = 0.0774$ | | | 0.81 | 0 | −4.781444e−002 | 2.625763e−002 | 0 |
| $r_7 = \infty$ | $d_7 = 0.1433$ | | | 0.63 | | | | |
| $r_8 = 2.7249$ | $d_8 = 0.6667$ | 1.585 | 30 | 1.11 | −1.582000e+001 | −2.578950e−002 | 1.784059e−002 | 0 |
| $r_9 = 0.4327$ | $d_9 = 2.0506$ | 1.53 | 56 | 1.11 | −1.352000e | −2.090017e−001 | 2.123760e−001 | −9.276478e−002 |
| $r_{10} = -2.2159$ | $d_{10} = 0.4356$ | | | 1.36 | −9.377000e | −4.898513e−002 | 2.335130e−002 | −5.777456e−004 |
| $r_{11} = \infty$ | $d_{11} = 0.8118$ | 1.5168 | 64.2 | | | | | |
| $r_{12} = \infty$ | $d_{12} = 1.0000$ | | | | | | | |

Table 2 can calculate the following data.

As shown in FIG. 6, in the wide-angle lens according to Embodiment Two, if the back focal distance of focal distance 1.00 mm can be 2.2474 mm after a cover glass being inserted, a long enough back focal distance can be ensured.

The value of F is 2.45, which ensures enough brightness for a wide-angle lens.

$h_2$ is 2.78 mm, $r_2$ is 2.9282 mm, $n_1$ is 1.5300, $v_1$ is 56.0, f is 1.00 mm, and calculations showed that the optical length D is 11.348 mm.

The above data is plug into the following formula.

$h_2/r_2 = 2.78/2.9282 = 0.949$, $n_1 = 1.5300$, $f/D = 0.088$, $v_1 = 56.0$, and $\theta = 193.8°$.

We learn that the wide-angle lens according to Embodiment Two meets any of the following conditional expressions (1)-(5).

$h_2/r_2 < 0.95$     (1), $1.49 < n_1 < 1.59$     (2), $0.08 \leq f/D \leq 0.1$     (3), $54 \leq v_1 \leq 65$     (4), and $193° < \theta < 220°$     (5).

The vertical axis of the aberration curve in FIG. 7 shows incident height h (FNO.), and the maximum corresponds to F2.45. The ratio of the distance of the aberration curve from the optical axis to the maximal image height is also shown. The magnitude of the aberration is shown in the horizontal axis in the unit of mm.

Figure 8:
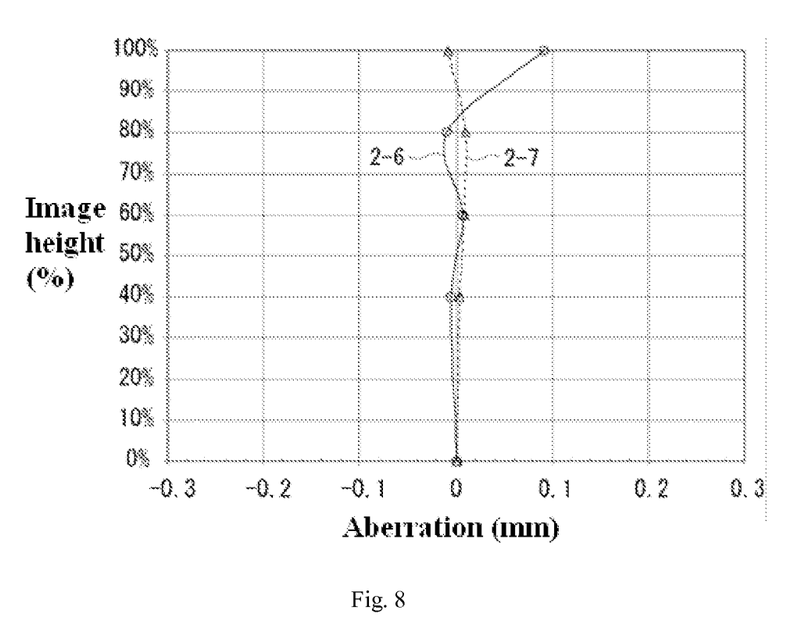
FIG. 8 is an astigmatism curve of a wide-angle lens according to Embodiment Two of the present disclosure.
Figure 9:
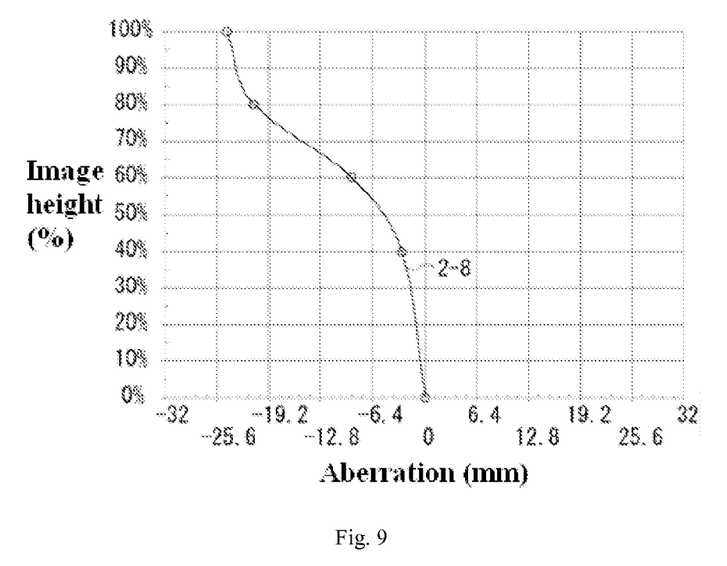
FIG. 9 is a distortion curve of a wide-angle lens according to Embodiment Two of the present disclosure.

The image heights of 100%, 80%, 60%, 40% and 0% in FIGS. 8-9 correspond to the heights of 2.204 mm, 1.664 mm, 1.171 mm, 0.733 mm and 0 mm on the practical image-side respectively.

As shown in FIGS. 7-9, the above chromatic aberration, spherical aberration, astigmatism and optical distortion have been corrected well.

Embodiment Three

Figure 10:
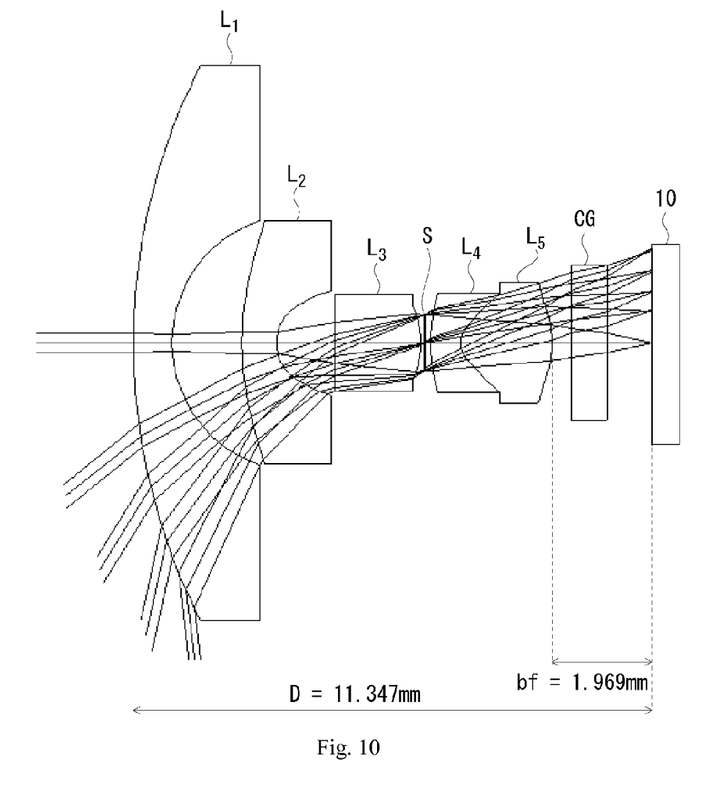
FIG. 10 is a schematic diagram illustrating a wide-angle lens according to Embodiment Three of the present disclosure.

Please refer to FIG. 10, illustrating a wide-angle lens according to Embodiment Three. The structure of the wide-angle lens is the same as that of the wide-angle lens according to Embodiment One. The difference is that the first lens element L1 is made of acrylic resin PMMA (Polymethyl methacrylate), the second lens element $L_2$ is made of cycloolefin resin E48R, the third lens element $L_3$ and the fourth $L_4$ are made of polycarbonate AD5503, and the fifth lens element $L_5$ is made of cycloolefin resin E48R in Embodiment Three.

Please refer to the structured data of Embodiment Three in Table 3.

TABLE 3

| Curvature Radius ($r_i$) | Distance ($d_i$) | Refractive Index ($N_i$) | Abbe number ($V_i$) | Effective Radius ($h_i$) | Aspherical Coefficient | | | |
|---|---|---|---|---|---|---|---|---|
| | | | | | K | $A_4$ | $A_6$ | $A_8$ |
| $r_1$ = 13.615 | $d_1$ = 0.8596 | 1.492 | 57.8 | 6.21 | | | | |
| $r_2$ = 2.9 | $d_2$ = 1.5778 | 2.75 | | | | | | |
| $r_3$ = 7.7106 | $d_3$ = 0.7622 | 1.53 | 56 | 2.73 | 4.149000e−001 | 5.007547e−003 | −1.086037e−003 | 5.720909e−005 |
| $r_4$ = 0.8357 | $d_4$ = 1.3066 | | | 1.17 | −5.622000e−001 | −4.523205e−002 | 3.643608e−002 | 1.233140e−002 |
| $r_5$ = 9.1939 | $d_5$ = 1.9341 | 1.585 | 30 | 1.1 | 0 | −4.435977e−002 | 3.938015e−002 | −3.518331e−002 |
| $r_6$ = −2.0401 | $d_6$ = 0.0774 | | | 0.81 | 0 | −4.781444e−002 | 2.625763e−002 | 0 |
| $r_7$ = ∞ | $d_7$ = 0.1433 | | | 0.63 | | | | |
| $r_8$ = 2.7249 | $d_8$ = 0.6667 | 1.585 | 30 | 1.11 | −1.582000e+001 | −2.578950e−002 | 1.784059e−002 | 0 |
| $r_9$ = 0.4327 | $d_9$ = 2.0506 | 1.53 | 56 | 1.11 | −1.352000e | −2.090017e−001 | 2.123760e−001 | −9.276478e−002 |
| $r_{10}$ = −2.2159 | $d_{10}$ = 0.4335 | | | 1.36 | −9.377000e | −4.898513e−002 | 2.335130e−002 | −5.777456e−004 |
| $r_{11}$ = ∞ | $d_{11}$ = 0.8118 | 1.5168 | 64.2 | | | | | |
| $r_{12}$ = ∞ | $d_{12}$ = 1.0000 | | | | | | | |

Table 3 can calculate the following data.

As shown in FIG. 10, in the wide-angle lens according to Embodiment Three, if the back focal distance of focal distance 1.00 mm can be 2.2453 mm after a cover glass being inserted, a long enough back focal distance can be ensured.

The value of F is 2.45, which ensures enough brightness for a wide-angle lens.

$h_2$ is 2.75 mm, $r_2$ is 2.90 mm, $n_1$ is 1.4920, $v_1$ is 57.8, f is 1.00 mm, and calculations showed that the optical length D is 11.347 mm.

The above data is plug into the following formula.

$$h_2/r_2 = 2.78/2.9282 = 0.948,$$

$$n_1 = 1.4920,$$

$$f/D = 0.088,$$

$$v_1 = 57.8, \text{ and}$$

$$\theta = 193.8°$$

We learn that the wide-angle lens according to Embodiment Three meets any of the following conditional expressions (1)-(5).

$$h_2/r_2 < 0.95 \quad (1),$$

$$1.49 < n_1 < 1.59 \quad (2),$$

$$0.08 \leq f/D \leq 0.1 \quad (3),$$

$$54 \leq v_1 \leq 65 \quad (4), \text{ and}$$

$$193° < \theta < 220° \quad (5)$$

Figure 11:
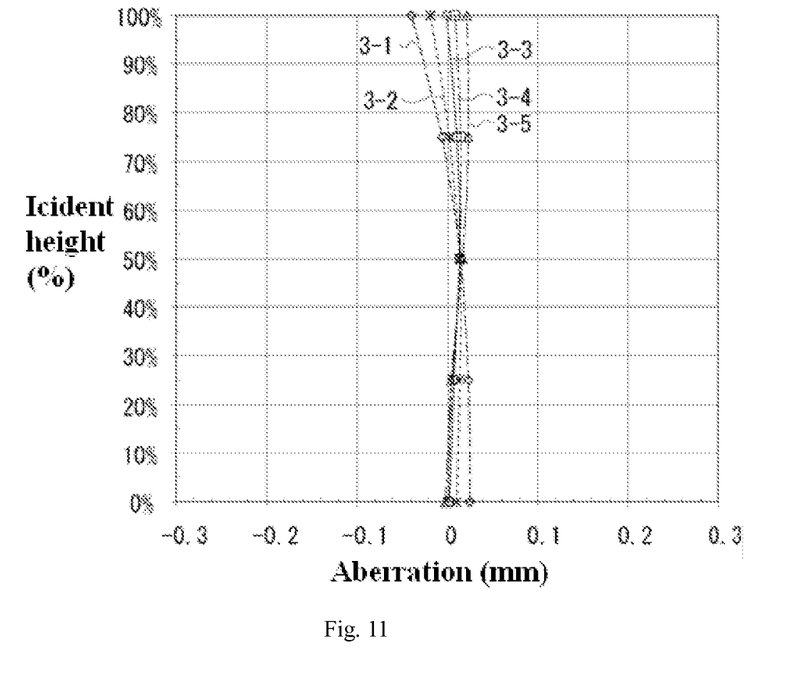
FIG. 11 is a chromatic aberration and spherical aberration curve of a wide-angle lens according to Embodiment Three of the present disclosure.

In FIG. 11, 3-1 shows an aberration curve of g-line, 3-2 shows an aberration curve of F-line, 3-3 shows an aberration curve of e-line, 3-4 shows an aberration curve of d-line, and 3-5 shows an aberration curve of C-line.

In FIG. 12, 3-6 shows an aberration curve on the meridian plane, and 3-7 shows an aberration curve on the sagittal plane.

In FIG. 13, 3-8 shows an optical distortion curve.

The vertical axis of the aberration curve in FIG. 11 shows incident height h (FNO.), and the maximum corresponds to F2.45. The ratio of the distance of the aberration curve from the optical axis to the maximal image height is also shown. The magnitude of the aberration is shown in the horizontal axis in the unit of mm.

Figure 12:
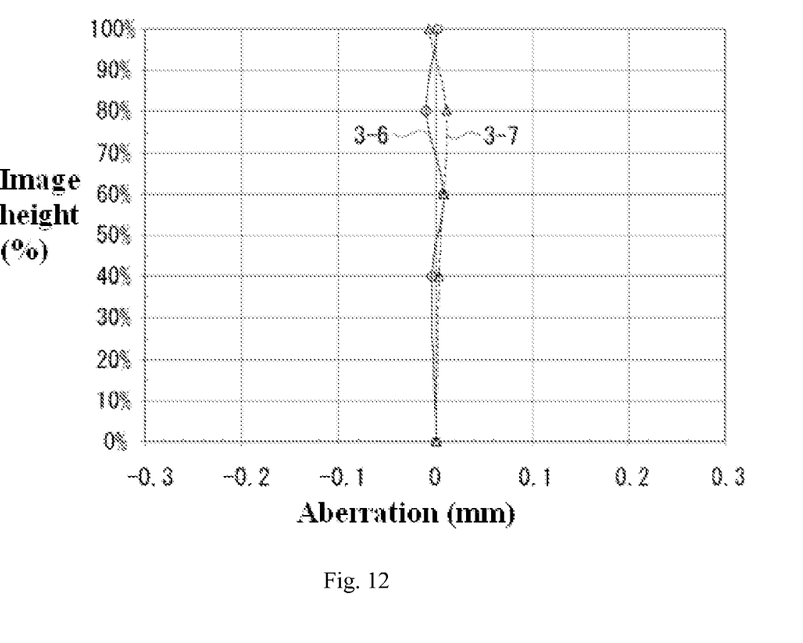
FIG. 12 is an astigmatism curve of a wide-angle lens according to Embodiment Three of the present disclosure.
Figure 13:
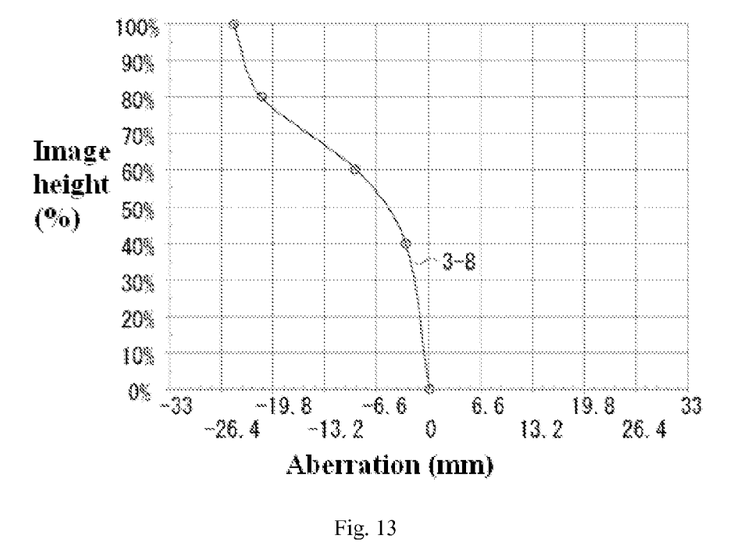
FIG. 13 is a distortion curve of a wide-angle lens according to Embodiment Three of the present disclosure.

The image heights of 100%, 80%, 60%, 40% and 0% in FIGS. 12-13 correspond to the heights of 2.107 mm, 1.631 mm, 1.161 mm, 0.730 mm and 0 mm on the practical image-side respectively.

As shown in FIGS. 11-13, the above chromatic aberration, spherical aberration, astigmatism and optical distortion have been corrected well.

Embodiment Four

Figure 14:
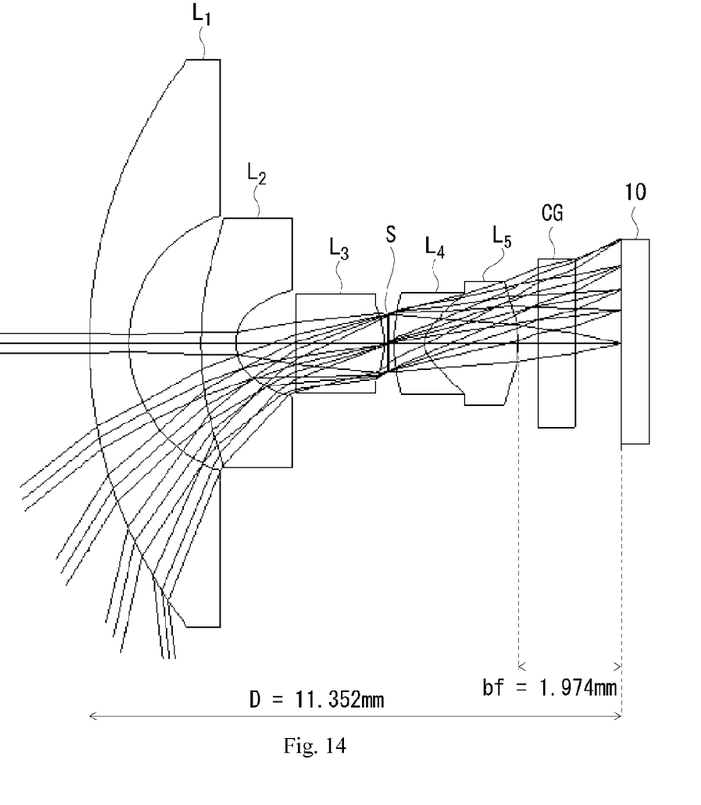
FIG. 14 is a schematic diagram illustrating a wide-angle lens according to Embodiment Four of the present disclosure.

Please refer to FIG. 14, illustrating a wide-angle lens according to Embodiment Four. The structure of the wide-angle lens is the same as that of the wide-angle lens according to Embodiment One. The difference is that the first lens element $L_1$ is made of crown glass BACD5 (produced by HOYA Corporation), the second lens element $L_2$ is made of cycloolefin resin E48R, the third lens element $L_3$ and the fourth lens element $L_4$ are made of polycarbonate AD5503, and the fifth lens element $L_5$ is made of cycloolefin resin E48R.

Please refer to the structured data of Embodiment Four in Table 4.

TABLE 4

| Curvature Radius ($r_i$) | Distance ($d_i$) | Refractive Index ($N_i$) | Abbe number ($V_i$) | Effective Radius ($h_i$) | Aspherical Coefficient | | | |
|---|---|---|---|---|---|---|---|---|
| | | | | | K | $A_4$ | $A_6$ | $A_8$ |
| $r_1$ = 10.091 | $d_1$ = 0.8596 | 1.58913 | 61.25 | 6.21 | | | | |
| $r_2$ = 2.97 | $d_2$ = 1.5778 | | | 2.81 | | | | |
| $r_3$ = 7.7106 | $d_3$ = 0.7622 | 1.53 | 56 | 2.73 | 4.149000e−001 | 5.007547e−003 | −1.086037e−003 | 5.720909e−005 |
| $r_4$ = 0.8357 | $d_4$ = 1.3066 | | | 1.17 | −5.622000e−001 | −4.523205e−002 | 3.643608e−002 | 1.233140e−002 |
| $r_5$ = 9.1939 | $d_5$ = 1.9341 | 1.585 | 30 | 1.1 | 0 | −4.435977e−002 | 3.938015e−002 | −3.518331e−002 |
| $r_6$ = −2.0401 | $d_6$ = 0.0774 | | | 0.81 | 0 | −4.781444e−002 | 2.625763e−002 | 0 |
| $r_7$ = ∞ | $d_7$ = 0.1433 | | | 0.63 | | | | |
| $r_8$ = 2.7249 | $d_8$ = 0.6667 | 1.585 | 30 | 1.11 | −1.582000e+001 | −2.578950e−002 | 1.784059e−002 | 0 |

TABLE 4-continued

| Curvature Radius ($r_i$) | Distance ($d_i$) | Refractive Index ($N_i$) | Abbe number ($V_i$) | Effective Radius (hi) | K | $A_4$ | $A_6$ | $A_8$ |
|---|---|---|---|---|---|---|---|---|
| $r_9$ = 0.4327 | $d_9$ = 2.0506 | 1.53 | 56 | 1.11 | −1.352000e | −2.090017e−001 | 2.123760e−001 | −9.276478e−002 |
| $r_{10}$ = −2.2159 | $d_{10}$ = 0.4386 | | | 1.36 | −9.377000e | −4.898513e−002 | 2.335130e−002 | −5.777456e−004 |
| $r_{11}$ = ∞ | $d_{11}$ = 0.8118 | 1.5168 | 64.2 | | | | | |
| $r_{12}$ = ∞ | $d_{12}$ = 1.0000 | | | | | | | |

Table 4 can calculate the following data.

As shown in FIG. 14, in the wide-angle lens according to Embodiment Four, if the back focal distance of focal distance 1.00 mm can be 2.2504 mm after a cover glass being inserted, a long enough back focal distance can be ensured.

The value of F is 2.45, which ensures enough brightness for a wide-angle lens.

$h_2$ is 2.78 mm, $r_2$ is 2.9282 mm, $n_1$ is 1.5300, $v_1$ is 56.0, f is 1.00 mm, and calculations showed that the optical length D is 11.348 mm.

The above data is plug into the following formula.

$$h_2/r_2=2.78/2.9282=0.946,$$

$$n_1=1.58913,$$

$$f/D=0.088,$$

$$v_1=61.25, \text{ and}$$

$$\theta=193.8°.$$

We learn that the wide-angle lens according to Embodiment Four meets any of the following conditional expressions (1)-(5).

$$h_2/r_2<0.95 \quad (1),$$

$$1.49<n_1<1.59 \quad (2),$$

$$0.08 \leq f/D \leq 0.1 \quad (3),$$

$$54 \leq v_1 \leq 65 \quad (4), \text{ and}$$

$$193°<\theta<220° \quad (5).$$

Figure 15:
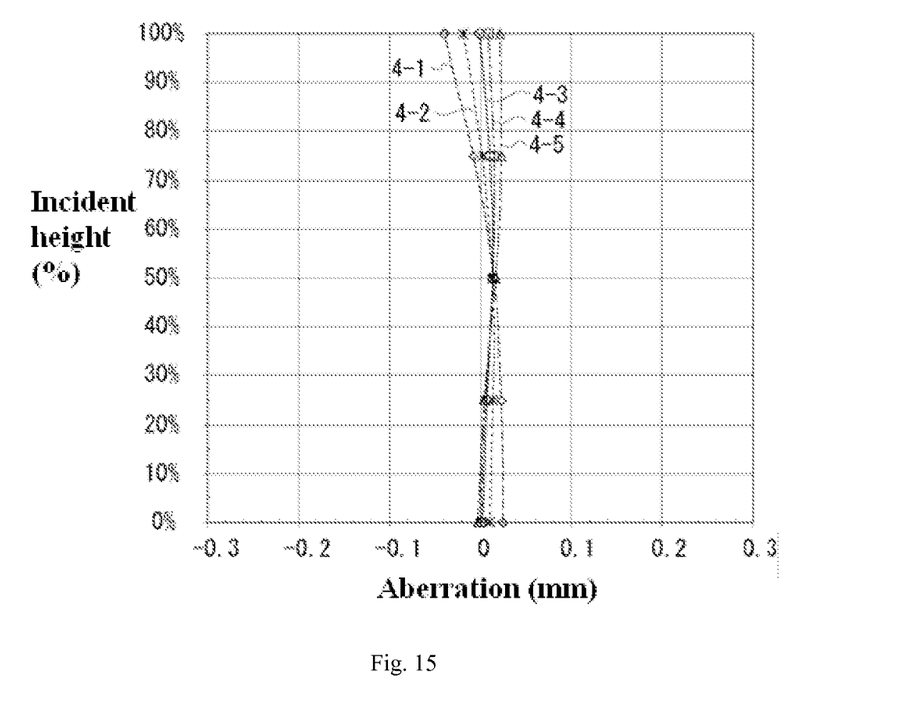
FIG. 15 is a chromatic aberration and spherical aberration curve of a wide-angle lens according to Embodiment Four of the present disclosure.

In FIG. 15, 4-1 shows an aberration curve of g-line, 4-2 shows an aberration curve of F-line, 4-3 shows an aberration curve of e-line, 4-4 shows an aberration curve of d-line, and 4-5 shows an aberration curve of C-line.

In FIG. 16, 4-6 shows an aberration curve on the meridian plane, and 2-7 shows an aberration curve on the sagittal plane.

In FIG. 17, 4-8 shows an optical distortion curve.

The vertical axis of the aberration curve in FIG. 15 shows incident height h (FNO.), and the maximum corresponds to F2.45. The ratio of the distance of the aberration curve from the optical axis to the maximal image height is also shown. The magnitude of the aberration is shown in the horizontal axis in the unit of mm.

Figure 16:
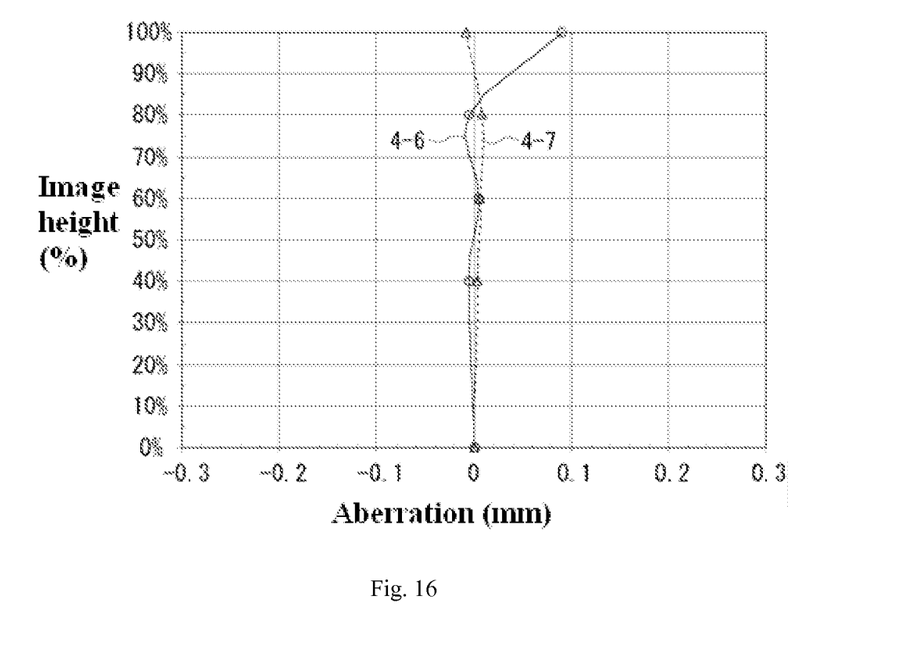
FIG. 16 is an astigmatism curve of a wide-angle lens according to Embodiment Four of the present disclosure.
Figure 17:
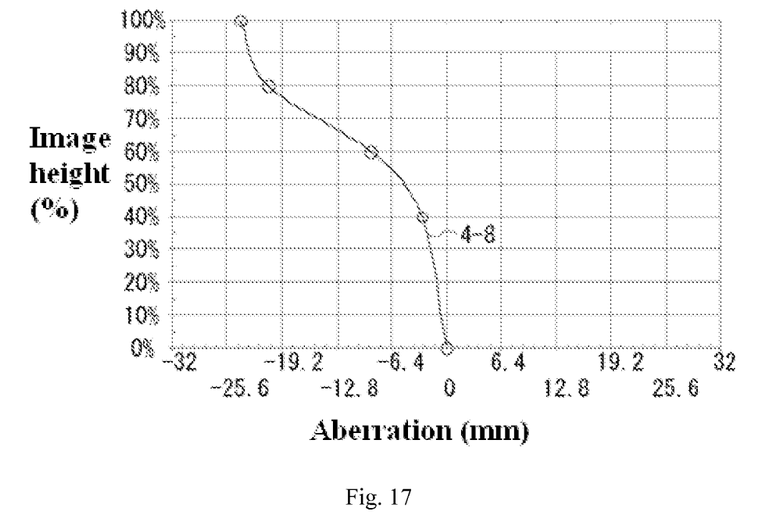
FIG. 17 is a distortion curve of a wide-angle lens according to Embodiment Four of the present disclosure.

The image heights of 100%, 80%, 60%, 40% and 0% in FIGS. 16-17 correspond to the heights of 2.311 mm, 1.701 mm, 1.182 mm, 0.735 mm and 0 mm on the practical image-side respectively.

As shown in FIGS. 15-17, the above chromatic aberration, spherical aberration, astigmatism and optical distortion have been corrected well.

The optical length of the wide-angle lens can be shortened on the premise that the back focal distance of the wide-angle lens can be sufficiently protected by design a wide-angle lens that can meet the conditional expressions (1)-(4) (such as the lenses described in the above embodiments). Meanwhile, various aberrations of the wide-angle lens can be compensated well.

In addition, in the above embodiments, the first lens element $L_1$, the second lens element $L_2$ and the fifth lens element $L_5$ use cycloolefin resin, the third lens element $L_3$ and fourth lens element $L_4$ use polycarbonate, but in addition, even if the lens does not use an optical resin material, for example, uses a material such as mold glass, the material also can be used to make up a lens of the wide-angle lens of the present disclosure if the material can meet the condition recorded in the description.

In the application, the above wide-angle lens needs to be mounted on a CCD image sensor to form the final camcorder. In addition to provide a cover glass CG between the fifth lens element $L_5$ and the illuminated face of the image sensor, it can provide an infrared ray filter, which requires the space between the fifth lens element $L_5$ and the imaging plane (i.e., an illuminated face of an image sensor) is larger than 0.95 mm.

If the first lens element $L_1$ is a glass lens, the above wide-angle lens can apply to severe environment such as a violent thunderstorm or sand storm. In addition, for the wide-angle lens of Embodiment Two and Embodiment Three, the first lens element $L_1$ can be a resin lens to reduce the production cost of the whole wide-angle lens.

The wide-angle lens according to above embodiments can not only apply to an image input apparatus such as mobile phone, portable computer, personal digital assistants and personal computer, but it also can apply in a digital camera, a toy with a photographic lens inside having image recognition function, a photographic lens equipped with a car, and a monitor, inspecting or security apparatus with a photographic lens inside.

The above embodiments are chosen and described in order to explain the principles of the present disclosure and their practical application so as to activate others skilled in the art to utilize the present disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A wide-angle lens comprising:
   a first lens element $L_1$, a second lens element $L_2$, a third lens element $L_3$, an aperture diaphragm S, a fourth lens element $L_4$ and a fifth lens element $L_5$ arranged from an object plane to an image plane;

the first lens element $L_1$ is a meniscus lens element having a negative focal power and protruding toward the object plane, the second lens element $L_2$ is a meniscus lens element having a negative focal power and protruding toward the object plane, the third lens element $L_3$ is a lens element having a positive focal power and protruding toward the image plane, the fourth lens element $L_4$ is a meniscus lens element having a negative focal power and protruding toward the object plane, and the fifth lens element $L_5$ is a lens element having a positive focal power;

both sides of the first lens element $L_1$ are spherical surfaces; and, both sides of the second lens element $L_2$, both sides of the third lens element $L_3$, both sides of the fourth lens element $L_4$ and both sides of the fifth lens element $L_5$ are aspheric surfaces; and the wide-angle lens meets the following requirements:

$$0.91 < h_2/r_2 < 0.95,$$

$$1.49 < n_1 < 1.59,$$

$$0.08 \leq f/D \leq 0.1,$$

$$54 \leq v_1 \leq 65, \text{ and}$$

$$193° < \theta < 220°,$$

where $h_2$ is an image-side effective radius of the first lens element $L_1$, $r_2$ is an image-side curvature radius of the first lens element $L_1$, $n_1$ is a D-line refractive index of the first lens element $L_1$, f is a focal distance of the wide-angle lens, D is an aperture of the wide-angle lens, $v_i$ is an Abbe number of the first lens element $L_1$, and θ is a viewing angle of the wide-angle lens.

2. The wide-angle lens of claim 1, wherein the first lens element $L_1$ is an optical glass lens element, the second lens element $L_2$ is an optical resin lens element, the third lens element $L_3$ is an optical resin lens element, the fourth lens element $L_4$ is an optical resin lens element and the fifth lens element $L_5$ is an optical resin lens element.

3. The wide-angle lens of claim 1, wherein the first lens element $L_1$ is an optical resin lens element, the second lens element $L_2$ is an optical resin lens element, the third lens element $L_3$ is an optical resin lens element, the fourth lens element $L_4$ is an optical resin lens element and the fifth lens element $L_5$ is an optical resin lens element.

4. The wide-angle lens of claim 1, wherein the first lens element $L_1$ is a crown glass lens element, the second lens element $L_2$ is a cycloolefin resin lens element, the third lens element $L_3$ is a polycarbonate resin lens element, the fourth lens element $L_4$ is a polycarbonate resin lens element and the fifth lens element $L_5$ is a cycloolefin resin lens element.

5. The wide-angle lens of claim 1, wherein the first lens element $L_1$ is a cycloolefin resin lens element, the second lens element $L_2$ is a cycloolefin resin lens element, the third lens element $L_3$ is a polycarbonate resin lens element, the fourth lens element $L_4$ is a polycarbonate resin lens element and the fifth lens element $L_5$ is a cycloolefin resin lens element.

6. The wide-angle lens of claim 1, wherein the first lens element $L_1$ is an acrylic lens, the second lens element $L_2$ is a cycloolefin resin lens element, the third lens element $L_3$ is a polycarbonate resin lens element, the fourth lens element $L_4$ is a polycarbonate resin lens element and the fifth lens element $L_5$ is a cycloolefin resin lens element.

7. A wide-angle lens comprising:
   a first lens element $L_1$, wherein the first lens element $L_1$ is a meniscus lens element having a negative focal power and protruding toward the object plane;
   a second lens element $L_2$, wherein the second lens element $L_2$ is a meniscus lens element having a negative focal power and protruding toward the object plane;
   a third lens element $L_3$, wherein the third lens element $L_3$ is a lens element having a positive focal power and protruding toward the image plane;
   an aperture diaphragm S,
   a fourth lens element $L_4$, wherein the fourth lens element $L_4$ is a meniscus lens element having a negative focal power and protruding toward the object plane; and
   a fifth lens element $L_5$, wherein the fifth lens element $L_5$ is a lens element having a positive focal power;
   wherein both sides of the first lens element $L_1$ are spherical surfaces; and, both sides of the second lens element $L_2$, both sides of the third lens element $L_3$, both sides of the fourth lens element $L_4$ and both sides of the fifth lens element $L_5$ are aspheric surfaces.

8. The wide-angle lens as recited in claim 7 wherein the wide-angle lens meets the following requirements:

$$0.91 < h_2/r_2 < 0.95,$$

$$1.49 < n_1 < 1.59,$$

$$0.08 \leq f/D \leq 0.1,$$

$$54 < v_1 < 65, \text{ and}$$

$$193° < \theta < 220°,$$

where $h_2$ is an image-side effective radius of the first lens element $L_1$, $r_2$ is an image-side curvature radius of the first lens element $L_1$, $n_1$ is a D-line refractive index of the first lens element $L_1$, f is a focal distance of the wide-angle lens, D is an aperture of the wide-angle lens, $v_i$ is an Abbe number of the first lens element $L_1$, and θ is a viewing angle of the wide-angle lens.

* * * * *